(12) United States Patent
Gibbs et al.

(10) Patent No.: US 7,062,034 B2
(45) Date of Patent: Jun. 13, 2006

(54) INTERNATIONAL CALL PREFIX IDENTIFICATION AND FORMATTING

(75) Inventors: Benjamin K. Gibbs, Camas, WA (US); Richard Eric Helvick, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 10/917,697

(22) Filed: Aug. 13, 2004

(65) Prior Publication Data

US 2006/0034446 A1    Feb. 16, 2006

(51) Int. Cl.
*H04M 3/00*    (2006.01)

(52) U.S. Cl. ............ 379/354; 379/355.02; 379/355.08; 379/356.01

(58) Field of Classification Search ................ 379/354, 379/355.02, 355.08, 356.01
See application file for complete search history.

(56) References Cited

U.S. PATENT DOCUMENTS

| | | | |
|---|---|---|---|
| 5,299,261 A | 3/1994 | Bogart et al. | |
| 5,305,372 A | 4/1994 | Tomiyori | |
| 5,333,180 A | 7/1994 | Brown et al. | |
| 5,455,858 A | 10/1995 | Lin | |
| 6,289,226 B1 | 9/2001 | Lekven et al. | |
| 2003/0152205 A1 | 8/2003 | Winkler | |
| 2004/0052357 A1 | 3/2004 | Logan et al. | |

FOREIGN PATENT DOCUMENTS

| | | |
|---|---|---|
| DE | 3924894 | 1/1991 |
| EP | 0 530 010 A2 | 8/1992 |
| JP | 5037457 | 2/1993 |
| WO | WO 00/41422 | 7/2000 |

OTHER PUBLICATIONS

"26.1 An example of formatting phone numbers," Rogue Wave Software, Inc., found at www.roguewave.com/support/docs/sourcepro/stdlibug/26-1.html.
"Beast of the Number: Parsing the Feral Phone," by mojotoad, Apr. 16, 2002, found at http://perlmonks.thepen.com/159645.html.

*Primary Examiner*—Jefferey F. Harold
(74) *Attorney, Agent, or Firm*—David C. Ripma

(57) ABSTRACT

An international telephone number is displayed by automatically inserting at least one space after the country code portion of the telephone number. In particular, when a telephone number having an International Direct Dialing (IDD) prefix, such as "00", "011" and "+", is received, the telephone number is then displayed by inserting at least one space between a country code portion contained in the telephone number and subsequent numbers of the telephone number. The country code portion of the telephone number is determined by accessing a look-up table for identifying the country code portion of the telephone number. Alternatively, the country code portion could be determined by comparing numbers appearing subsequent to the IDD prefix with predetermined country codes.

8 Claims, 2 Drawing Sheets

INTERNATIONAL CALL PREFIX IDENTIFICATION AND FORMATTING

BACKGROUND OF THE INVENTION

1. Field of the Invention

The present invention relates to telecommunication devices. In particular, the present invention relates to a system and a method for displaying telephone numbers and character strings on a display of a telecommunication device, such as a mobile telephone or a landline telephone.

2. Description of the Related Art

International Telecommunication Union (ITU) Recommendation E.123: "Notation for national and international telephone numbers" defines a standard way to write telephone numbers. E.123 recommends specific telephone number formats for national and international telephone numbers. Exemplary telephone numbers in the formats recommended by E.123 are shown below:

| | |
|---|---|
| National notation | (042) 123 4567 |
| International notation | +31 42 123 4567 |

E.123 recommends that a hyphen (-), space ( ), or period (.) be used to visually separate groups of numbers. Use of such characters tends to be country specific with a space character ( ) being the most commonly used. Parentheses in a telephone number are used to indicate digits that are sometimes not dialed.

International Direct Dialing (IDD) prefix is recommended as an international prefix that is required to dial a call from a country listed to another country. The IDD prefix is followed by a country code for the country that is being called. The IDD prefix situation in many countries has been regularly changing. Some countries have multiple IDD prefixes, with each IDD prefix used by a different long-distance carrier. To overcome the problem of changing and different IDD prefixes on mobile telephones, the Groupe Spécial Mobile (GSM), a study group formed by the Conference of European Posts and Telegraphs (CEPT), adopted from its inception a plus sign (+) as a generic IDD prefix for GSM mobile telephones, although country specific IDD prefixes still usually work. A separate "+" key is now rarely seen on GSM telephones. Instead, a + sign character is usually generated by pressing and holding the 0 or * key, or pressing the 0 or * key multiply times rapidly.

While E.123 recommends formats for national and international telephone numbers, telephone equipment, such as a mobile telephone, conventionally displays telephone numbers as a continuous string of numbers that is not readily interpreted by a user. Consequently, what is needed is a way to display a telephone number with appropriate country-code hyphenation so that a user can readily interpret an international telephone number.

SUMMARY OF THE INVENTION

The present invention provides a way to display a telephone number with appropriate country-code hyphenation so that a user can readily interpret an international telephone number.

The advantages of the present invention are provided by a system for displaying an international telephone number that includes a processor and a display. The processor receives a telephone number having an International Direct Dialing (IDD) prefix, such as "00", "011" or "+", and the display displays the telephone number having at least one space inserted between a country code portion contained in the telephone number and subsequent numbers of the telephone number. The processor further determines the country code portion of the telephone number by accessing a look-up table for identifying the country code portion of the telephone number. Alternatively, the processor determines the country code portion by comparing numbers appearing subsequent to the IDD prefix with predetermined country codes.

The present invention also provides a method of displaying an international telephone number in which a telephone number having an International Direct Dialing (IDD) prefix, such as "00", "011" and "+", is received or stored in the telephone or a memory card in the telephone. The telephone number is then displayed by inserting at least one space between a country code portion contained in the telephone number and subsequent numbers of the telephone number. The country code portion of the telephone number is determined by accessing a look-up table for identifying the country code portion of the telephone number. Alternatively, the country code portion could be determined by comparing numbers appearing subsequent to the IDD prefix with predetermined country codes.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE PRESENT INVENTION

The present invention provides an automatic country-code hyphenation of telephone numbers by inserting a space in an international telephone number after the country code to make the international telephone number easier to read on a display of a telephone than a continuous line of numbers. In particular, the present invention provides a technique for inserting a space at the correct point after the country code portion of an international phone number that has been entered and/or is displayed on a telephone having a display. The characters of either a currently dialed string or a stored telephone number are evaluated and when an international dialing prefix and a country code are identified, the present invention dynamically inserts a space after the country code so that international telephone numbers are automatically displayed to a user with appropriate country-code hyphenation.

ITU Recommendation E.164 recommends the country codes that should be used for dialing a telephone call from one country to another. Country codes vary in length and can be 1,2 or 3 digits long. The following is a list of country codes. The list also includes spare codes for future expansion.

1, 20, 210-269, 27, 280-299, 30-34, 350-359, 36, 370-389, 39-41, 420-429, 43-49, 500-509, 51-58, 590-599, 60-66, 670-699, 7, 800-809, 81-82, 830-839, 84, 850-859, 86, 870-899, 90-95, 960-979, 98, 990-999.

Table 1 shows a list of the country codes in an organization that is based on the length of the country code. The present invention uses the contents of Table 1 as a look-up table that is stored within a telephone, such as a mobile telephone, in order to identify a country code within a dialed or stored telephone number.

TABLE 1

| Number following IDD Prefix | Single digit country code? | Two-digit country code? | Three-digit country code? |
|---|---|---|---|
| 1, 7 | Yes | | |
| 20, 27, 30–34, 36, 39–41, 43–49, 51–58, 60–66, 81–82, 84, 86, 90–95, 98 | | Yes | |
| Any other number | | | Yes |

Alternatively, the contents and organization of Table 1 could be implemented as a series of comparison statements, e.g., if . . . then statements, to determine whether the country code is 1, 2 or 3 digits long.

Figure 1:
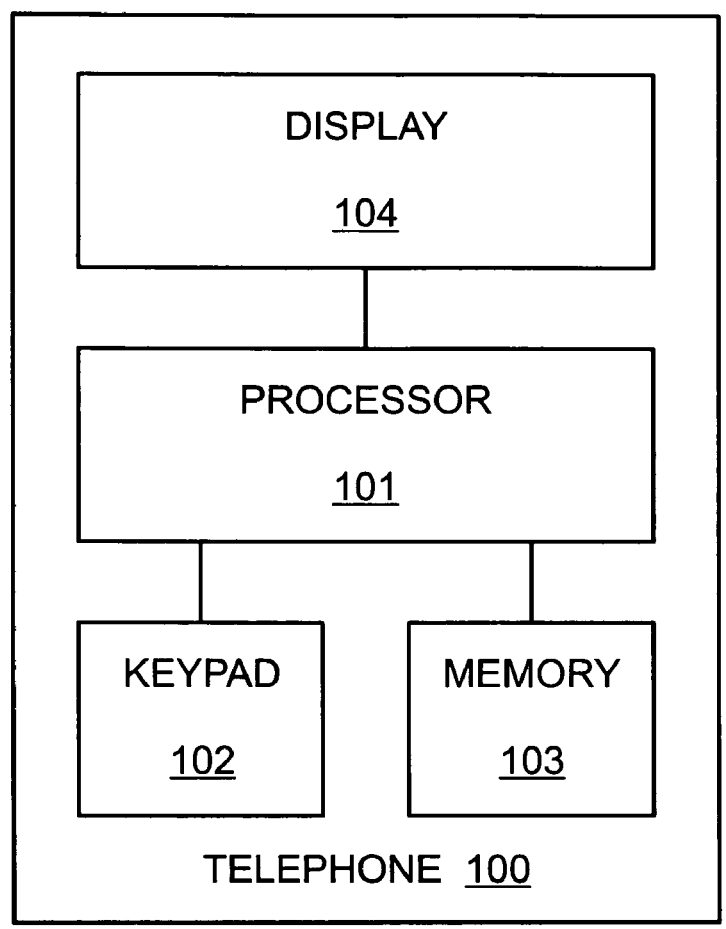
FIG. 1 shows a functional block diagram of a telephone according to the present invention that provides automatic country-code hyphenation of a telephone number.

FIG. 1 shows a functional block diagram of a telephone 100 according to the present invention that provides automatic country-code lo hyphenation of a telephone number. Telephone 100, which in one exemplary embodiment of the present invention is a mobile telephone, includes a processor 101, a keypad 102, a memory 103 and a display 104.

Telephone numbers and character strings manually entered into keypad 102 in a well-known manner are processed by processor 101 for determining whether the entered telephone number, or character string, is an international telephone number that should have automatic country-code hyphenation when it is displayed on display 104. Memory 103 stores telephone numbers and character strings in a well-known manner. When a user accesses a stored telephone number stored in memory 103, such as by accessing a phonebook application, processor 101 determines whether the accessed telephone number is an international telephone number that should have automatic country-code hyphenation when it is displayed on display 104. Telephone numbers stored in memory 103 are stored without automatic country-code hyphenation in the same memory space.

Automatic country-code hyphenation is added when an international number is accessed from memory 103.

It should be understood that telephone 100 could alternatively be, for example, a landline telephone, a facsimile machine, a hand-held computer, a laptop computer or a personal computer (PC).

Additionally, the components of telephone 100 can be embodied as one or more dedicated electronic circuits or one or more Application Specific Integrated Circuits (ASICs). It should be further understood that memory 103 could be contained within telephone 100 and/or could be a memory card that could be inserted into the telephone by a user. It should also be understood that FIG. 1 does not show all of the components that may be included with telephone 100 so that it is operational.

Figure 2:
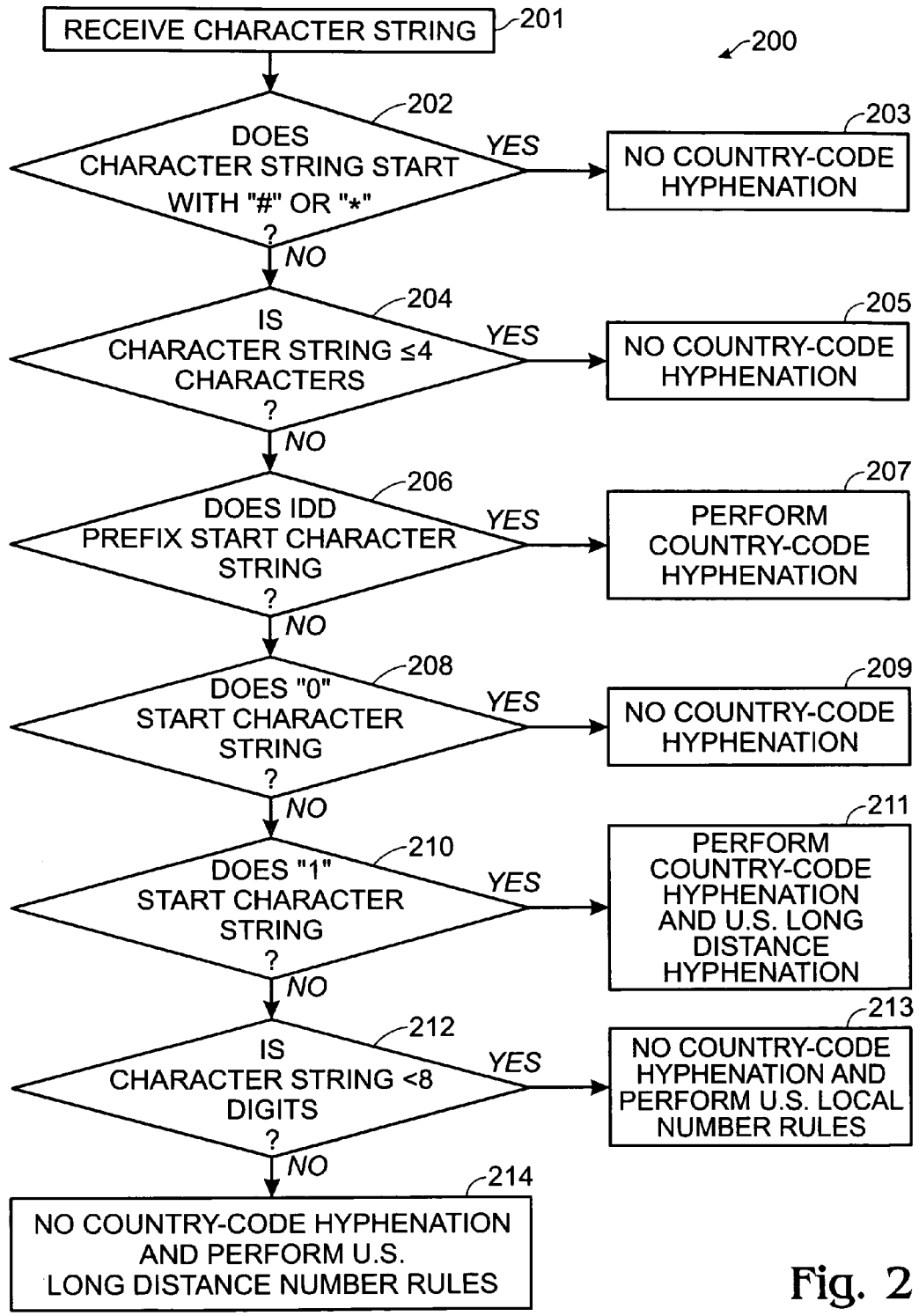
FIG. 2 shows a flow diagram of a method for providing automatic country-code hyphenation of a telephone number according to the present invention.

FIG. 2 shows a flow diagram 200 of a method for providing automatic country-code hyphenation of a telephone number according to the present invention. At step 201, a character string, or telephone number, is received by being manually entered into a keypad of a telephone or by being selected from, for example, a phonebook application. Alternatively, the character string can be a character string that is being edited through the keypad of a telephone. As yet another alternative, the character string could be received during an incoming telephone call. At step 202, it is determined whether the entered character string begins with "#" or "*". If so, flow continues to step 203 where no auto-country-code-hyphenation is performed when the character string is displayed so that GSM MMI codes, such as *#06* and *#31#, can be entered without causing confusion for a user.

If, at step 202, the entered character string does not begin with "#" or "*", flow continues to step 204 where it is determined whether the entered character string is four digits or less in length. If so, flow continues to step 205 where automatic country-code hyphenation is not performed when the character string is displayed, thereby allowing short code numbers, such as 123 or 8040, to be cleanly dialed by a user.

If, at step 204, the entered character string is more than four characters in length, flow continues to step 206 where it is determined whether the entered character string begins with "00", "011" or "+", such as 00 44 123456, 011 353 123456, +7 123456 or 00 1 360 555 1234. The most important IDD prefixes for GSM phones are "00", which is an ITU recommendation and is adopted by most countries; "011", which is the North American IDD prefix; and the "+" sign. If, at step 206, the entered character string starts with "00", "011" or "+", the entered character string is an international telephone number and flow continues to step 207 where automatic country-code hyphenation is performed when the telephone number is displayed. The length of the country code is determined using a look up table (Table 1) or series of comparison statements to determine whether the country code is 1, 2 or 3 digits long so that automatic hyphenation can be appropriately placed. It should be understood that other IDD prefixes could be used, such as the IDD prefix "0041". When the-entered character string starts with "00", "011" or "+", the present invention displays the telephone number in the following format:

<IDD><CC><space><space><2 digits><space><3 digits><space><4 digits

As an example, the international telephone number +313421234567 having the country code of 313 will be displayed by the present invention having two spaces after the country code as:

+313 42 123 4567

Alternatively, only a single space could be added after the country code:

<IDD><CC><space><rest of the phone number>

The exemplary telephone number +313421234567 would be displayed with this format as:

+313 421234567

If, at step 206, the entered character string does not start with "00", "011" or "+", flow continues to step 208 where it is determined whether the entered character string begins with "0," such as 0712345678 or 0987654321444. If so, flow continues to step 209, where no automatic country-code hyphenation is performed with the character string is displayed because valid US numbers do not start with the number "0" and such numbers should not be hyphenated.

If, at step 208, it is determined that the entered character string does not begin with "0", flow continues to step 210 where it is determined whether the entered character string begins with "1", such as the number 1 360 555 6666. If so, flow continues to step 211 where automatic country-code hyphenation is performed when the character string is displayed. Additionally, the entered character string is displayed using U.S. long distance telephone number format rules.

If, at step 210, it is determined that the entered character string does not start with "1", flow continues to step 212 where it is determined whether the entered character string is less than eight characters in length, such as the number 555 6666. If so, flow continues to step 213, where no automatic country-code hyphenation is performed when the character string is displayed.

If, at step 212, it is determined that the entered character string is eight characters or greater in length, such as the number 360 555 6666, flow continues to step 214 where no automatic country-code hyphenation is performed when the character string is displayed. Additionally, the entered character string is displayed using U.S. long distance telephone number format rules.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for displaying an international telephone number, comprising:
   a processor receiving a telephone number having an International Direct Dialing (IDD) prefix, the processor determining the country code portion of the telephone number by accessing a look-up table; and
   a display displaying the telephone number having at least one space inserted between the country code portion in the telephone number and subsequent numbers of the telephone number.

2. A system for displaying an international telephone number, comprising:
   a processor receiving a telephone number having an International Direct Dialing (IDD) prefix, wherein the processor determines the country code portion of the telephone number by comparing numbers appearing subsequent to the IDD prefix with predetermined country codes; and
   a display displaying the telephone number having at least one space inserted between the country code portion in the telephone number and subsequent numbers of the telephone number.

3. A of displaying an international telephone number, the method comprising:
   receiving a telephone number having an International Direct Dialing (IDD) prefix
   determining the country code portion of the telephone number by accessing a look-up table for identifying country codes of telephone numbers; and
   displaying the telephone number by inserting at least one space between a country code portion contained in the telephone number and subsequent numbers of the telephone number.

4. A of displaying an international telephone number, the method comprising:
   receiving a telephone number having an International Direct Dialing (IDD) prefix
   determining the country code portion of the telephone number by comparing numbers appearing subsequent to the IDD prefix with predetermined country codes; and
   displaying the telephone number by inserting at least one space between a country code portion contained in the telephone number and subsequent numbers of the telephone number.

5. In a mobile telephone, a system for displaying an international telephone number on a display, comprising:
   a processor receiving a string of numbers containing no spaces, the processor determining whether the string of numbers starts with an International Direct Dialing (IDD) prefix, and, in response an IDD prefix starting the string of numbers, the processor determining a predetermined country code within the string of numbers by accessing a look-up table for identifying predetermined country codes, and the processor inserting at least one space between the predetermined country code contained in the string of numbers and subsequent numbers in the string of numbers for display; and
   a display displaying the string of numbers with the at least one space inserted between the predetermined country code and subsequent numbers in the string of numbers.

6. In a mobile telephone including a keypad, a system for displaying an international telephone number on a display, comprising:
   a processor receiving a string of numbers from a sequential entry of the string of numbers into the keypad, the string of numbers containing no spaces, the processor determining whether the string of numbers starts with an International Direct Dialing (IDD) prefix, and, in response an IDD prefix starting the string of numbers, the processor determining a predetermined country code within the string of numbers and inserting at least one space between the predetermined country code contained in the string of numbers and subsequent numbers in the string of numbers for display; and
   a display displaying the string of numbers with the at least one space inserted between the predetermined country code and subsequent numbers in the string of numbers.

7. A method of displaying an international telephone number on a display of a mobile telephone, the method comprising:
   receiving a string of numbers that includes an International Direct Dialing (IDD) prefix, the string of numbers containing no spaces;
   determining whether the string of numbers starts with an International Direct Dialing (IDD);
   determining a predetermined country code within the string of numbers by accessing a look-up table for identifying the predetermined country codes;
   inserting at least one space between the predetermined country code contained in the telephone number and subsequent numbers of the string of numbers in response to the string of numbers starting with an IDD prefix; and
   displaying the string of numbers with the at least one space inserted between the predetermined country code and subsequent numbers in the string of numbers.

8. The method according to claim 7, wherein the mobile telephone further includes a keypad and the step of receiving the string of numbers includes receiving the string of numbers from a sequential entry of the numbers into a keypad of the mobile telephone.

* * * * *